May 17, 1960 R. J. RINK 2,937,056
WARNING SIGNAL FOR MILL BEARING LUBRICATING SYSTEM
Filed Sept. 3, 1957 2 Sheets-Sheet 1
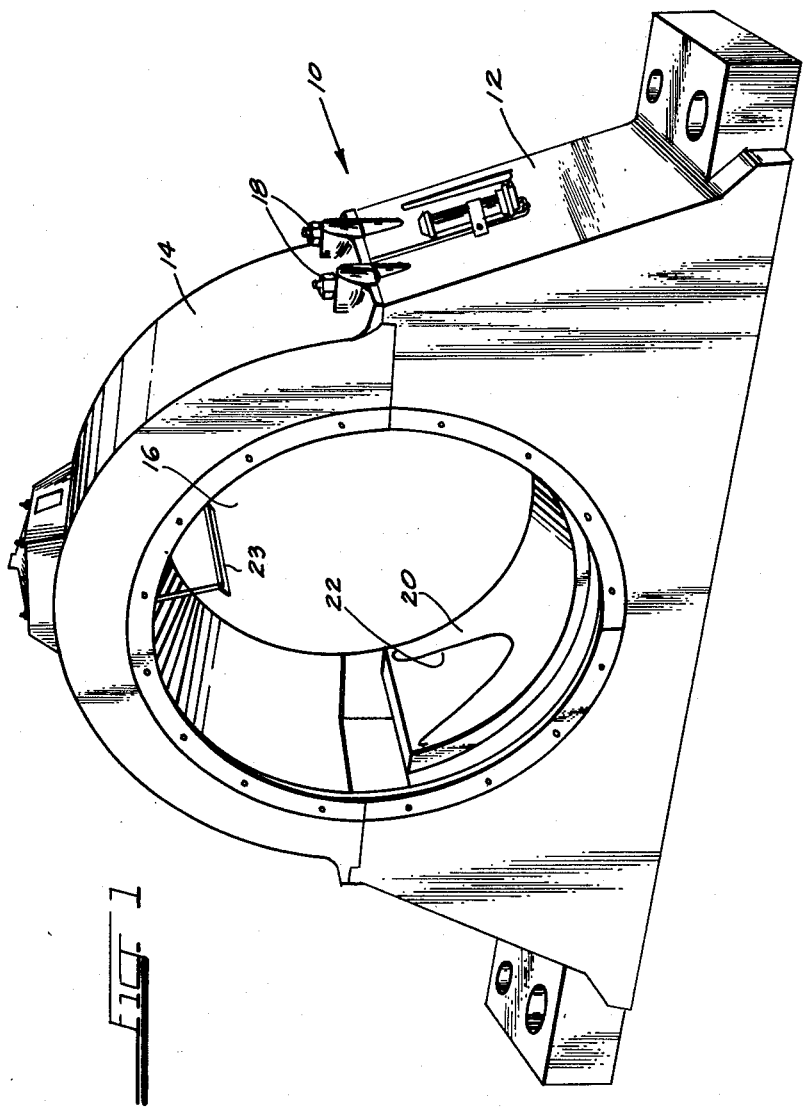
INVENTOR.
ROBERT J. RINK
BY
Parker and Carter
ATTYS.

May 17, 1960 R. J. RINK 2,937,056
WARNING SIGNAL FOR MILL BEARING LUBRICATING SYSTEM
Filed Sept. 3, 1957 2 Sheets-Sheet 2
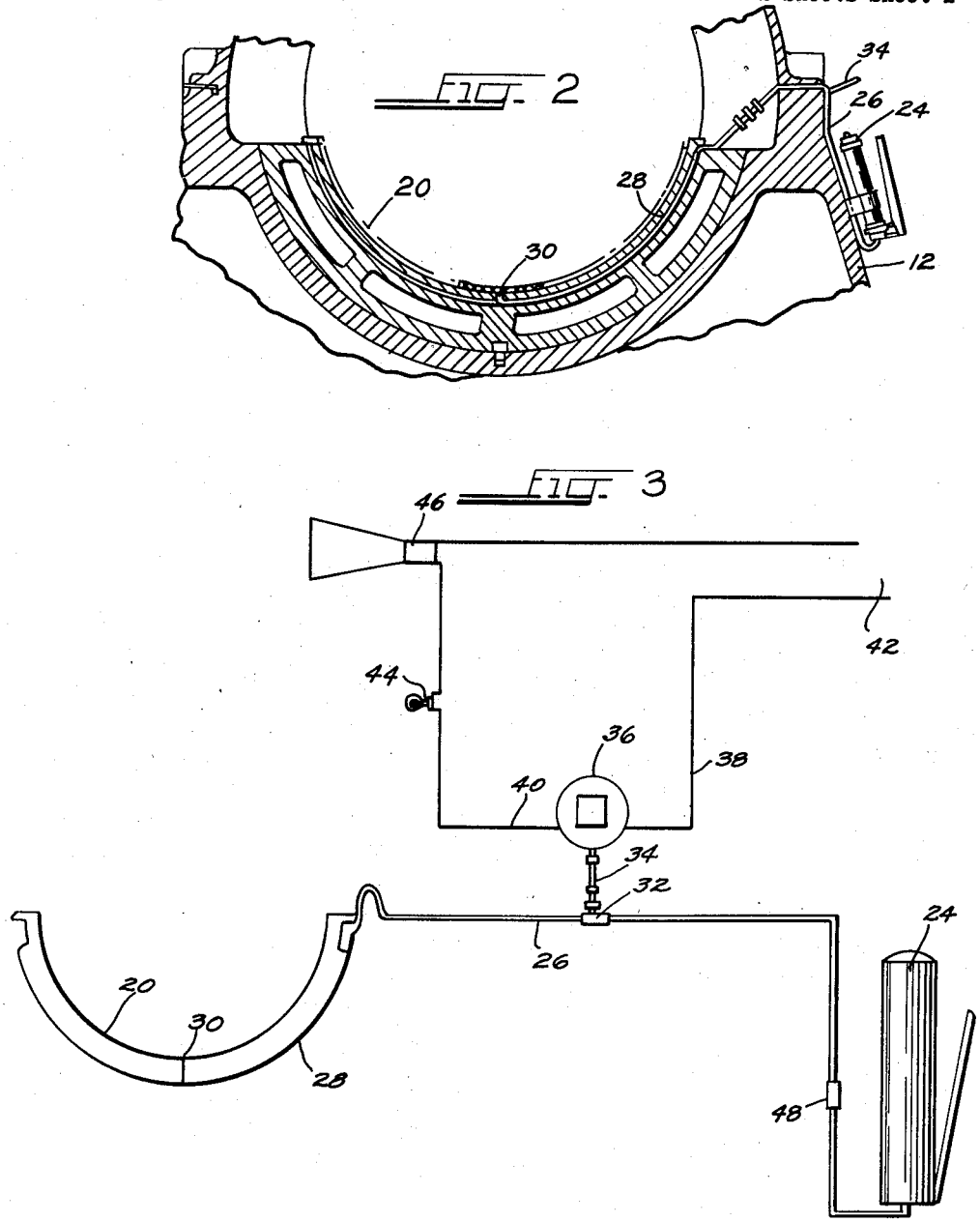
INVENTOR.
ROBERT J. RINK
BY
Parker and Carter
Att'ys.

United States Patent Office 2,937,056
Patented May 17, 1960

2,937,056

WARNING SIGNAL FOR MILL BEARING LUBRICATING SYSTEM

Robert J. Rink, West Allis, Wis., assignor to Nordberg Manufacturing Company, Milwaukee, Wis., a corporation of Wisconsin Application September 3, 1957, Serial No. 681,802

3 Claims. (Cl. 308—122)

This invention is in the field of lubricating systems or devices and is concerned primarily with so-called telltale signals or alarms for indicating a lubrication failure in a ball mill bearing or the like.

A primary object of this invention is an alarm system responsive to the fluid pressure of a mill bearing's lubrication system.

Another object is an alarm arrangement in combination with the hydraulic lift system for a ball mill or the like.

Another object is an hydraulic lift system for the trunnion of a horizontally disposed ball mill, or the like, which includes an alarm which, during operation of the mill, responds to the fluid pressure developed in the lift line.

Another object is a new and improved hydraulic lift system or ball mill trunnion which is in addition to the normal or conventional lubrication circulating system.

Another object is an alarm arrangement responsive to fluid pressure in a mill trunnion lubricating system that is efficient and fail safe.

Other objects will appear from time to time in the ensuring specification and drawings, in which:

Figure 1 is a perspective of a bearing for a horizontally disposed ball mill;

Figure 2 is a lateral section through a portion of the bearing of Figure 1; and

Figure 3 is a schematic of the trunnion lift system and alarm.

In Figure 1, a bearing housing or frame is indicated generally at 10, and includes a base or bottom portion 12 and a top cap or cover 14, enclosing a bore or bearing area 16 constructed to accept and support the trunnion of a ball mill, for example. Both the base and cap or cover extend approximately 180 degrees and are suitably connected by bolts 18 or the like.

It will be understood that such a ball mill may have a conventional cylindrical housing for tumbling balls and material to be ground with a trunnion projecting from each end. The trunnions are normally carried or supported by suitable bearings, such as in Figure 1.

In any event, an inserted bearing member or segment 20 is disposed and removably held by the lower half or base and the trunnion is carried thereby. The top cap merely functions as a cover and the bearing itself extends under only approximately the lower half of the trunnion. Thus the upper half is not in contact with the bearing surface and the cover 14 or cap merely protects the bearing material or half shell from dirt, dust and foreign matter.

In operation, when the mill is rotating, the suitable lubricant is supplied to a lubricating feeding groove or the like, such as shown at 22 in the bearing member in Figure 1. This is a part of what is referred to herein as the main circulating, lubricating system which may be a flood system, bucket system, or any suitable conventional system. For example if the lubricating system is a bucket system a plurality of buckets on the trunnion would pick up oil or any suitable lubricant from a sump in the bottom portion 12 and deposit it at the top on a suitable distributor pan 23 which may be conventional.

When the mill is stopped, the weight of the mill and trunnions, which may be of the order of several hundred thousand pounds in the case of large units, squeezes all of the lubricant from between the trunnions and bearings. During starting, there is metal to metal contact between the trunnions and bearings and if the mill is rotated without first forcing a lubricant between the trunnion and bearing, the material of the bearing itself will be damaged.

For this purpose it is conventional to provide a lift system which includes a suitable hand pump, for example at 24, connected to the side of the base or elsewhere. Instead of a hand pump, it may be an electrically or mechanically driven pump. In any event, the pump is connected by a suitable line 26 that extends through the base to a suitable line 28 that opens at 30 in the bottom of the bearing element. Before starting, the pump 24 is actuated to force a suitable lubricant, such as oil, between the bearing and trunnion which, in effect, creates a film of oil between them, thereby lifting the trunnion. Such a lift system is normally provided for each bearing and trunnion of a mill. As soon as rotation of the mill begins, the normal or main lubricant circulating system will feed oil to the bearing and the film will be maintained accordingly. In relatively large installations, the lifting pressure required may reach from 300 to 500 lbs. per sq. in., whereas the pressures in the regular or main lubricating system during normal operation are of the order of 250 to 400 lbs. per sq. in.

A primary problem in proper ball mill maintenance and operation is failure of the lubricant circulating system. If the pressure gets excessively low, the film may disappear in localized or extensive areas and the trunnion will damage the bearing material. Or the trunnion may also be damaged.

To prevent this, an alarm is provided which includes a connection at 32 with a lead 34 running to a suitable pressure responsive switch 36 or the like. The switch is connected to suitable leads 38 and 40 which run to a suitable source of electric current, designated generally at 42. The circuit may be either A.C. or D.C. and the circuit includes any suitable alarms, such as a light at 44 and a horn or gong 46. To prevent the pressure in the main circulating system from forcing lubricant back into the tank 24 during normal operation, a check valve is provided at 48 in line 26.

The use, operation and function of the invention are as follows:

One of the primary problems in ball mill operation and maintenance is bearing failure caused by a lack of lubricant between the trunnions and bearings. Many systems have been devised for signaling the operator when the pressure of the lubricant between the trunnions and bearings is insufficient. Temperature responsive elements have been used but all of these have proved inadequate. It is conventional to have some sort of alarm system respond to the fluid pressure in the main lubricant circulating system, but this also is subject to variations in ball mill operation which are difficult to control and give inaccurate results in the alarm system.

Practically all ball mills have a trunnion lifting hydraulic system which includes an hydraulic lift pump of any suitable type with a line connected to the bottom of the bearing. Prior to starting, the pump is actuated to force lubricant between the trunnions and bearings, thereby lifting the entire mill off of the bearings.

As soon as the mill turns over, the main lubricant circulating system begins operation and the film is maintained between the trunnion and bearing. Thereafter, during rotation of the mill, the pressure of the lubricant supplied by the main circulating system will reach from approximately 250 to 400 lbs. per sq. in. This pressure will be communicated to the lift pump line and the check valve, such as at 48, prevents this pressure from reaching the pump.

Therefore, the pressure of the lift pump line between the bearing and the check valve during operation of the mill will be static and I propose to connect an auxiliary line into this lift pump line to communicate the static pressure of the lubricant to a suitable pressure responsive switch. The details of the switch in and of themselves are not important. The point is that the switch responds to the static pressure in the lift pump line. Any suitable types of alarms may be connected to the switch, preferably electrically, to warn the operator when the static pressure falls below a certain safe minimum. A light and horn have been shown, but other devices may be used.

The important point is that the alarm does not respond to the dynamic pressure of the fluid or lubricant in the normal circulating system. It is the static pressure of the lubricant backed up in the lift pump line and this pressure is far more sensitive, more accurate, and more reliable than the dynamic pressure in the main system. The pump 24 is not subjected to this pressure and it is important that the connection 32 be ahead of the check valve 48.

The details of the main lubricant circulating system are not important. Suffice it to say that it could be a flood system, a bucket system, or any suitable type.

The static pressure responsive switch 36 could be any suitable commercial unit available on the market at the present time. Such switches are inexpensive and quite reliable.

This arrangement is much more sensitive and therefore more reliable than any temperature responsive units and has proven to be more accurate than any system that responds to the dynamic pressure of the fluid in the main circulating system.

I claim:
1. In a bearing assembly or the like, a generally upright bearing frame having a curvilinear bearing with a generally horizontally disposed axis adapted to receive a trunnion, a circulating lubricating system for supplying lubricant to the bearing during normal operation, a trunnion lifting system for supplying lubricating fluid under pressure to the bearing to raise the trunnion during starting, said lifting system including a pump and a line connected from the pump to the bearing at a point below the trunnion, a check valve in the line so that a static pressure will be developed during normal operation in the line between the check valve and the bearing, and a signal device connected to the line between the check valve and the bearing responsive to the static pressure developed therein and operative in the event of a failure in the circulating lubricating system during normal operation to indicate such failure.

2. The structure of claim 1 further characterized in that the bearing is a half shell.

3. The structure of claim 1 further characterized in that the signal device includes an electrically energized light.

References Cited in the file of this patent
UNITED STATES PATENTS

| | | |
|---|---|---|
| 585,445 | Lumb | June 29, 1897 |
| 2,502,318 | Fischer | Mar. 28, 1950 |
| 2,615,419 | Topping | Oct. 28, 1952 |

FOREIGN PATENTS

| | | |
|---|---|---|
| 331,734 | Germany | Jan. 14, 1921 |
| 472,858 | Great Britain | Oct. 1, 1937 |